United States Patent [19]

Perr

[11] E Re. 30,189

[45] Reissued Jan. 15, 1980

[54] FUEL INJECTION SYSTEM FOR DIESEL ENGINES

[75] Inventor: Julius P. Perr, Columbus, Ind.

[73] Assignee: Cummins Engine Company, Columbus, Ind.

[21] Appl. No.: 852,281

[22] Filed: Nov. 17, 1977

Related U.S. Patent Documents

Reissue of:

[64] Patent No.: 3,965,875
Issued: Jun. 29, 1976
Appl. No.: 375,350
Filed: Jul. 2, 1973

[51] Int. Cl.[2] ..... F02M 39/00

[52] U.S. Cl. ..... 123/139 AY; 123/139 R

[58] Field of Search ..... 123/32 R, 139 R, 139 AP, 123/32 G, 139 AE, 139 AR, 139 AY; 239/533

[56] References Cited

U.S. PATENT DOCUMENTS

| | | | |
|---|---|---|---|
| 2,068,585 | 1/1937 | Wurtele | 123/139 R |
| 3,237,568 | 3/1966 | Morgan et al. | 123/139 R |
| 3,810,453 | 5/1974 | Wolfe | 123/139 R |

FOREIGN PATENT DOCUMENTS

| | | | |
|---|---|---|---|
| 556742 | 10/1943 | United Kingdom | 123/32 R |

*Primary Examiner*—Ronald B. Cox
*Attorney, Agent, or Firm*—Leydig, Voit, Osann, Mayer & Holt, Ltd.

[57] ABSTRACT

A fuel injection system for a diesel engine. An injection rate control device, such as an auxiliary spring, is connected in line with the conventional injection train which operates the injector plunger in synchronism with the rotation of the camshaft. When an auxiliary spring is used as the injection rate control device, the auxiliary spring has a lower spring rate than that of the injection train so that the injector plunger is advanced at a different rate when it is under the control of the auxiliary spring. Means are included for rendering the auxiliary spring ineffective during a portion of the plunger advancement so that the rate of plunger advancement is controlled by the auxiliary spring during the initial part of the advancing stroke, and by the conventional part of the injection train during the balance of the advancing stroke. The auxiliary spring automatically varies ignition timing and injection rate as a function of engine speed and/or load.

11 Claims, 6 Drawing Figures

FUEL INJECTION SYSTEM FOR DIESEL ENGINES

Matter enclosed in heavy brackets [ ] appears in the original patent but forms no part of this reissue specification; matter printed in italics indicates the additions made by reissue.

DESCRIPTION OF THE INVENTION

The present invention relates generally to fuel injection systems and, more particularly, to an improved fuel injection system for diesel engines.

It is a primary object of the present invention to provide an improved fuel injection system for diesel engines which reduces undesirable engine emissions. In this connection, a more particular object of one specific aspect of the invention is to provide such an improved fuel injection system which reduces the emission of unburned hydrocarbons by advancing the beginning of injection, and reduces the emission of nitrogen oxides by controlling the initial heat release via reducing fuel injected in the ignition delay period.

Another object of the invention is to provide an improved fuel injection system of the foregoing type which automatically varies the injection timing in response to variations in the engine speed and/or load.

It is a further object of the invention to provide an improved fuel injection system for diesel engines which reduces engine noise and mechanical stresses on the engine by reducing the rate of pressure rise and the maximum gas pressure in the engine cylinders.

Still another object of the invention is to provide such an improved fuel injection system which reduces the peak pressure and temperature of the engine cylinder, thereby reducing peak structural loads on the engine as well as the thermal load on the cooling system.

Other objects and advantages of the system will be apparent from the following detailed description and the accompanying drawings, in which.

Figure 5:
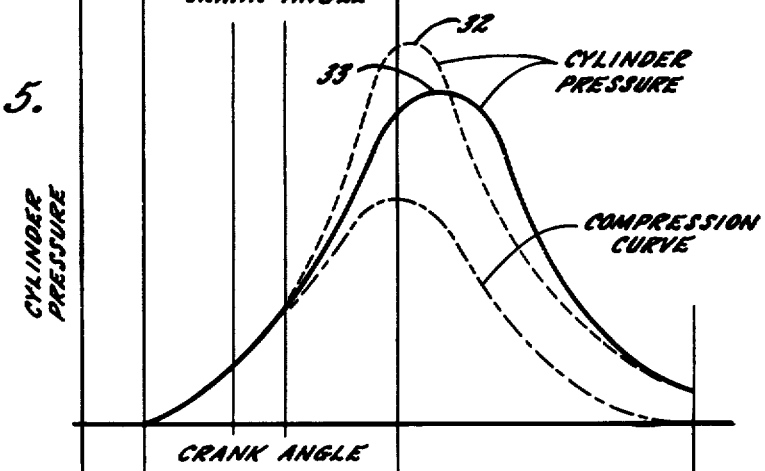
Figure 6:
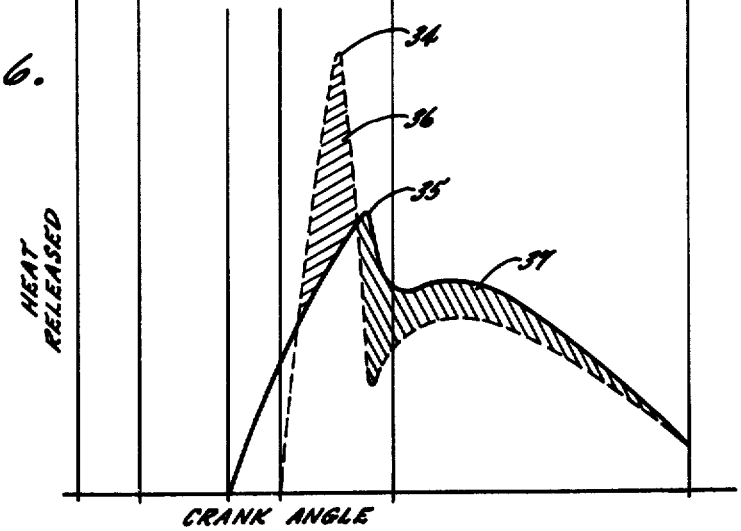

FIG. 5 is a graphic illustration of the pressure characteristics of a hypothetical diesel engine cylinder supplied with fuel by two different injection systems, one with and one without the present invention, along with a compression curve (with no fuel injected) for the same engine; and FIG. 6 is a graphic illustration of the heat release characteristics of a hypothetical diesel engine cylinder supplied with fuel by two different injection systems, one with and one without the present invention.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention.

Figure 1:
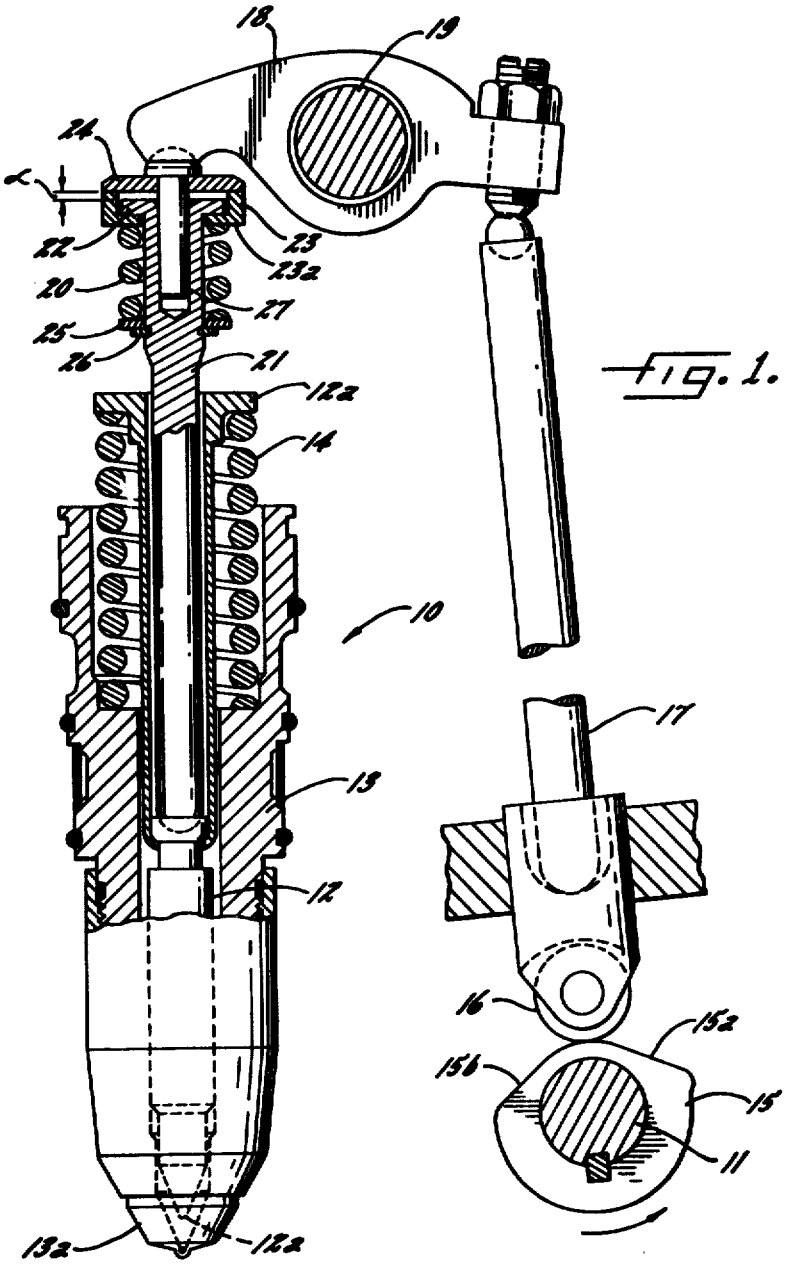
FIG. 1 is a side elevation, partially in section, of a fuel injection system embodying the invention, with the plunger of the fuel injector in its fully retracted position.

Turning now to the drawings and referring first to FIG. 1, there is shown an injection train for driving a conventional fuel injector 10 and from a camshaft 11. The fuel injector itself may be any conventional fuel injector, such as those described in the assignee's U.S. Pat. Nos. 3,146,949 and 3,351,288. In the illustrative example, the injector 11 includes a plunger 12 mounted for reciprocating movement in a housing 13, for injecting fuel through a nozzle 13a threaded onto the lower end of the housing 13. A return spring 14 disposed between the housing 13 and a flange 12a on the top of the plunger 12 biases the plunger toward its retracted position as illustrated in FIG. 1.

For driving the plunger 12 from its retracted position to its advanced position (during which fuel is injected into the engine) the injection train includes the following conventional elements: a cam 15 keyed to the camshaft 11, a cam follower 16 riding on the cam 15, a push rod 17 connected to the cam follower 16, and a rocker arm 18 pivoted on a shaft 19 and connected at one end to the push rod 17. It will be appreciated that this train of elements has an inherent spring rate which is a principal factor affecting the rate at which the injector plunger 12 is advanced and, therefore, the rate at which fuel is injected into the engine. This inherent spring characteristic of the injection train is due to flexing of the various elements of the train, and play between the interconnected elements, when they are subjected to the driving force exerted on one end of the train by the cam 15 and the opposed resistance of the fuel injector at the opposite end of the train. In a conventional injection train of the type illustrated, the inherent spring rate of the train is normally proportional, i.e., the deflection of the train varies in proportion to variations in the load on the train.

When the fuel injector 10 is driven by an injection train composed of the conventional elements described thus far, the fuel is normally injected into the engine cylinder by the plunger 12 travelling at a substantially constant rate determined in part by the spring rate of the injection train. During the initial portion of the period during which fuel is injected into the cylinder, the injected fuel is not ignited and simply accumulates within the cylinder while the piston advances toward the injector to increase the gas pressure and temperature in the combustion region of the cylinder. This pre-ignition interval of the injection period is commonly referred to as the "ignition delay" interval. More specifically, the term "ignition delay" refers to the time interval between the beginning of injection of fuel into the combustion chamber and the point at which cylinder pressure rise due to combustion is detected on a cylinder pressure time record. This interval is also sometimes referred to in the art as the "pressure rise delay". After the fuel is ignited, which is caused by compression of the atomized fuel and other gases in the cylinder in a diesel engine, injection of fuel continues for an interval which is normally much shorter than the ignition delay interval. That is, ignition occurs before the advancing or injecting stroke of the injector plunger is completed.

In accordance with one important aspect of the present invention, the injector plunger is advanced at a first rate during one portion of the advancing stroke, and at a different second rate during another portion of the advancing stroke. By selecting the particular rates at which the plunger is advanced, and the changeover point at which the rate of plunger advancement is changed, this variable rate system may be used to provide a number significant improvements in various operating characteristics of the engine, with little or no increase in cost. For example, the fuel may be injected into the cylinder at a first relatively slow rate during at least a substantial initial portion of the ignition delay interval, and at a second relatively fast rate during the balance of the injecting stroke of the injector plunger; thus, sufficient fuel is injected during the early portion of the injection period to permit ignition to occur at the selected time, and yet the total quantity of fuel injected prior to ignition is sufficiently low to reduce the rate of pressure rise, maximum gas pressure, and maximum gas temperature below the values that these parameters would have if the fuel were injected at the normal rate during the entire injection period. During the latter portion of the injection period, the fuel is injected at a faster rate so that the total quantity of fuel injected during the entire injection period is the same as the amount that would be injected if the normal injection rate were maintained throughout the entire injection period, thereby providing the same amount of energy for driving the piston. By injecting less fuel during the early portion of the injection period, and more fuel during the later portion, the shape of the pressure and temperature curves is altered while maintaining the same areas under the curves as would be obtained with a normal injection rate during the entire injection period.

In accordance with one specific aspect of the invention, an auxiliary spring means connected in line with the injection train is used to control the rate of plunger advancement, and thus the fuel injection rate, during a predetermined early portion of the injection period. Thus, in the particular embodiment illustrated in FIG. 1, an auxiliary coil spring 20 is disposed around a rod 21 connected to the injector plunger 12 at its lower end. Actually the lower end of the rod 21 is merely seated in a recess formed by the plunger 12 with the plunger return spring 14 continuously urging the plunger 12 up against the rod 21. At its upper end the rod 21 forms an integral flange 22 fitted within a cylinder 23 forming an integral bottom wall 23a and closed at the top by a cap 24. The axial dimension of the flange 22 is less than that of the internal cavity formed by the cylinder 23 to permit limited axial movement of the rod 21 and the cylinder 23 relative to each other. When the injector plunger is retracted, the auxiliary spring 20 urges the rod 21 downwardly relative to the cylinder 23 so that the underside of the flange 22 abuts the bottom wall 23a of cylinder 23. To provide this biasing action, the upper end of the spring 20 bears against the cylinder bottom wall 23a, while the lower end of the spring bears on an annulus 25 supported by a snap-ring 26 set into a groove in the rod 21.

Typically, the spring 20 has a spring rate of about 2500 pounds per inch and is compressed by a biasing force of about 450 pounds in the position shown in FIG. 1, with the cam follower 16 riding on the lower level of the cam 15. Thus, it would take an upward force of about 450 pounds on the rod 21 to lift its flange 22 off the bottom wall 23a of cylinder 23.

As the cam follower 16 rides up the ramp 15a of the cam 15, the injector train pushes the plunger 12 downward. During the period before the bottom tip 12a of the plunger 12 hits the fuel to be injected through nozzle 13a, the speed of the tip 12a is governed almost entirely by the slope of the cam ramp 15a and by the geometrical relationships of the various parts of the injector train, assuming all of such parts to be perfectly rigid. This assumption is valid except for a very slight flexing of the injector train caused by the inertia of the accelerating plunger 12; the speed of the downward moving plunger tip 12a is thus reduced to a very small degree, but this reduction is extremely small compared to the reduction that takes place later on in the injection process.

When the plunger tip 12a hits the body of the fuel metered into the chamber at the bottom of the plunger bore, the plunger 12 begins to force the fuel through the nozzle 13a. This causes a large reaction force on the push rod 17, rocker arm 18, plunger rod 21 and the other parts of the injector train. As a result, there is a measurable amount of flexing of the injector train parts, even with conventional injector trains where all the parts are relatively rigid. For instance, the effective spring rate of a typical, conventional injector train is about 50,000 pounds per inch measured on the injector side of the rocker arm. This means that the length of a conventional injector train is shortened by roughly 1/50,000 of an inch for every pound of force applied to the injector plunger 12 when it hits the fuel. If this force is 500 pounds, then the injector train is shortened 1/100 of an inch. The net result is that even with conventional injector trains, the plunger pushes against the fuel at a rate somewhat slower than would be expected from a theoretically rigid injector train.

With the present invention using the auxiliary spring 20, and with the engine running under a moderate or heavy load, the injector train does more than merely "flex" when the plunger hits the fuel. The action is better described as one of "collapsing." Providing the reaction force on the plunger during fuel injection, added to the force exerted on the plunger by the return spring 14, is enough to overcome the preloading or biasing force of the auxiliary spring 20, the flange 22 moves upwardly away from the bottom wall 23a of the cylinder 23, thereby compressing or "collapsing" the spring 20 until the top of the flange 22 abuts the cap 24. From the time downward movement of the plunger 12 begins until the flange 22 abuts the cap 24, therefore, the only connection between the plunger rod 21 and the cylinder 23 is through the coils of the auxiliary spring 20. Thus, while the flange 22 is moving from the cylinder bottom wall 23a to the cap 24, the auxiliary spring 20 determines the spring rate of the entire injector train.

Figure 2:
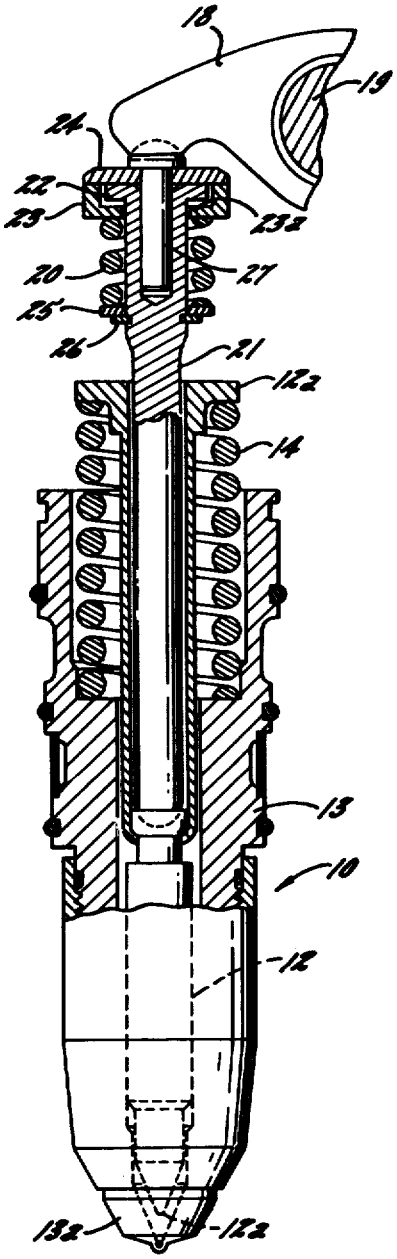
FIG. 2 is a side elevation, partially in section, of the injector end of the system shown in FIG. 1 with the plunger of the injector in a partially advanced position.

The spring 20 thus becomes a very influential link in the injector train. The rule that "the chain is only as strong as its weakest link" is very apparent under these circumstances, because the effective spring rate of the entire injector train is reduced to that of the spring 20. As was mentioned earlier, the spring 20 has a rate that is preferably about 2500 pounds per inch, or only about 1/20 of the 50,000 pounds per inch rate of the conventional injector train. With the injector train having such a reduced spring rate, the plunger tip 12a slows down to almost a standstill practically from the beginning of fuel injection (FIG. 1) until the plunger rod 21 contacts the cap 24 (FIG. 2). Consequently, during this initial period of injection, the plunger 12 is forcing fuel through the nozzle 13a at a relatively slow rate, compared to the rate at which fuel would be forced through the nozzle by the standard injection train without the auxiliary spring 20. In addition to beginning the fuel injection at a slower rate, the plunger 12 also starts the fuel injection earlier in the combustion cycle than the plunger of a standard injection train. This is because the auxiliary spring 20 lengthens the injector train slightly, and the plunger tip 12a is thereby advanced so that it hits the fuel at an earlier time. After the flange 22 abuts the cap 24, the pin 27 and the cap 24 form a direct rigid connection between the rocker arm 18 and the rod 21 so that the injection train is connected directly to the rod 21 and plunger 12 rather than through the auxiliary spring 20. Thus, further advancing movement of the rod 21 and the plunger 12 proceeds at a rate determined by the effective spring rate of the conventional portion of the injection train (e.g., 50,000 pounds per inch), which is a rate substantially greater than that of the spring 20. That is, the auxiliary spring 20 is bypassed, or rendered ineffective, when the rocker arm 18 and the rod 21 become rigidly connected by abutment of the cap 24 and the flange 22. Of course, the increased rate of advancement of the plunger 12 increases the fuel injection rate so that the required amount of fuel is injected into the engine during the balance of the injection period.

Figure 3:
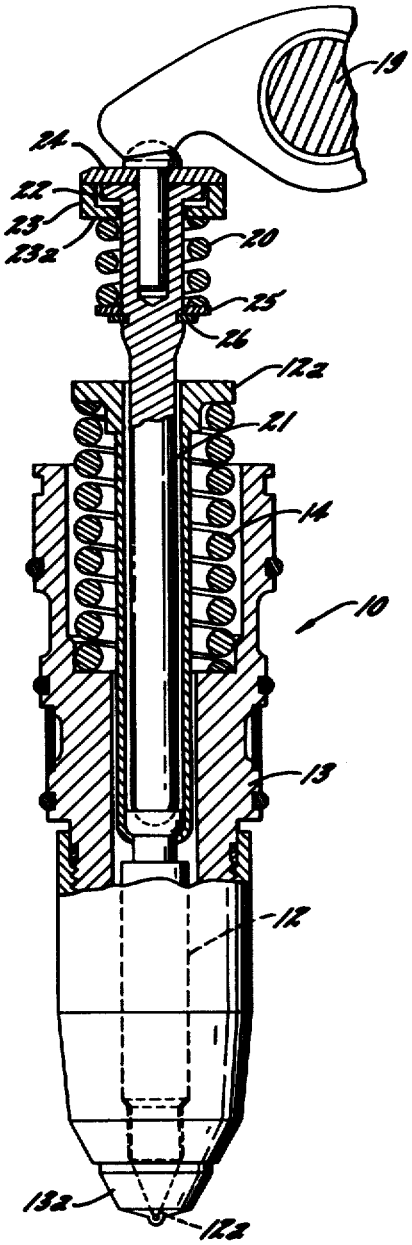
FIG. 3 is a side elevation, partially in section, of the injector end of the system shown in FIG. 1, with the plunger of the injector in its fully advanced position.

At the end of the injection period, the tip of the plunger 12 is fully seated in the injector nozzle, as illustrated in FIG. 3, with the auxiliary spring 20 still compressed. The injection train and the plunger 12 remain in this position until the cam follower 16 rides down the ramp 15b to return to the lower cam level, at which time the return spring 14 retracts the plunger 12, and the spring 20 expands to return the rod 21 and cylinder 23 to their starting positions as illustrated in FIG. 1. At this point the injection system is ready for another advancing stroke when the cam follower 16 rides up the ramp 15a again.

It will be appreciated that the injector train will collapse as described above only when the upward force on the injector plunger 12 is great enough to cause such a collapse. This upward force consists of two components. One is the force of the return spring 14 and the other is the reaction force on the plunger tip 12a caused by the injection of the fuel. The force of spring 14 is the same for all engine operating conditions, but the reaction force caused by the injection of fuel through the nozzle holes increases as either the engine load or engine speed increases. An engine load increase means that the fuel in the metering chamber is at a higher level before injection, and the plunger will thus hit the fuel sooner and at a time when it is travelling faster (due to the shape of the cam 15). The faster the plunger travels, the faster the fuel injection rate becomes, and this increases the reaction force on the plunger. Similarly, an increased engine speed also results in an increased plunger speed, increased fuel injection rate, and an increased reaction force on the plunger. Thus, whether the injector train collapses is determined primarily by whether there is a large enough reaction force on the plunger tip 12a, and this reaction force is in turn proportional to the speed and/or load of the engine.

As an example of a typical set of conditions that will cause the collapse of injector train as described above, consider the case of an auxiliary spring 20 preloaded with a force of 450 pounds (downward on the plunger 12), and a plunger return spring 14 exerting an upward force of 100 pounds at the time the plunger tip 13a hits the fuel. In order to lift the flange 22 off the bottom wall 23a of cylinder 23, there must be an additional upward force of 350 pounds in reaction to the plunger pushing the fuel through the nozzle 13a. A reaction force of this magnitude is normally not generated when the engine is idling or running at a low speed and a low load.

The amount of load on the engine required to bring the spring 20 into operation as described above will depend on the preloading of the spring 20. If there is a high preloading on the spring 20, the load and/or speed of the engine must also be high before the spring 20 has an effect on the fuel injection rate, and even for such high engine loads and/or speeds, the overall effect on the fuel injection rate is less than when the spring has a low preloading.

The effect of the spring 20 on the fuel injection rate also depends on the exact distance $\alpha$ (FIG. 1) which the flange 22 must travel before it hits the cap 24. The greater the distance $\alpha$, the longer the initial period of reduced fuel injection.

Figure 4:
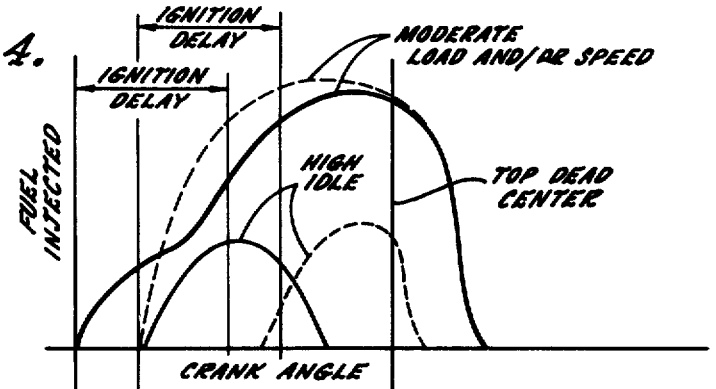
FIG. 4 is a graphic illustration of injection rate characteristics of a hypothetical diesel engine cylinder supplied with fuel by two different injection systems, one with and one without the present invention, both at high idle and at moderate to high engine load and/or speed.

In FIGS. 4–6 there are illustrated three different operating characteristics of a hypothetical diesel engine equipped with a fuel injection system of the type illustrated in FIGS. 1–3, both with and without the auxiliary spring 20. More specifically, FIG. 4 illustrates the fuel injection rate characteristic, FIG. 5 illustrates the cylinder pressure characteristic, and FIG. 6 is a heat release diagram. In each of the three figures, the solid line curve represents the characteristics obtained when the fuel injection system includes the auxiliary spring 20 as shown in FIGS. 1–3, while the broken line curve represents the characteristic obtained without the auxiliary spring 20 and with the rocker arm connected directly to the injector plunger. In addition, the lowest curve of FIG. 5, consisting of alternately short and long dashes, shows the cylinder pressure when no fuel is injected into the cylinder. All of these curves are intended to be merely qualitative representations of the respective characteristics, and the curves are not intended to be quantitatively representative of any particular diesel engine.

Turning first to the fuel injection curves in FIG. 4 for moderate to high engine loads and/or speeds, it can be seen that the fuel injection begins earlier with the auxiliary spring 20 in the injection train, because the train is slightly longer and the plunger tip 12a is lowered a corresponding distance. More important, less fuel is injected during the portion of the ignition delay interval when the plunger is advancing at a slower rate determined by the auxiliary spring 20. Just before ignition occurs, the injection rate is sharply increased due to the faster rate of advancement of the injector plunger as determined by the spring rate of the injection train. As can be seen in FIG. 4, the total amount of fuel injected by the two different systems is approximately the same, i.e., the areas under the two curves are approximately the same. However, the fuel injected by the system of this invention is injected over a longer time period, unless the cam profile is changed to shorten the injection duration. Such change in the cam profile might be desired so that the length of the injection period will remain the same.

Referring to the fuel injection curves in FIG. 4 for the engine operating at high idle, it will be seen that the insertion of the auxiliary spring 20 has no effect on the shape of the curve, because there is not enough force prior to the end of injection on the injector plunger to collapse the train to the position shown in FIG. 2. The timing of the injection is advanced, however, because with the spring 20 the injection train is slightly longer, and the plunger tip 12a is lowered a corresponding distance.

Turning next to FIG. 5, the lower amount of fuel present in the combustion zone of the cylinder at the time of ignition reduces the rate of gas pressure rise and the maximum pressure produced in the cylinder. That is, the rate of pressure rise and the maximum pressure produced without the auxiliary spring 20, which are indicated by the curve 32 in FIG. 5, are both higher than the rate of pressure rise and maximum pressure produced with the auxiliary spring 20, indicated at 33 in FIG. 5. A lower rate of gas pressure rise and lower maximum pressure in the cylinder are desirable because they reduce engine noise and mechanical stresses on the engine.

FIG. 6 illustrates that the maximum temperature produced in the engine cylinder is also reduced because of the smaller amount of fuel contained in the cylinder at the time of ignition. Thus, the heat released following ignition in the normal engine system rises sharply to a maximum 34, and then drops sharply. When the auxiliary spring 20 is employed, however, the temperature rises at a slower rate, reaching a lower maximum point 35, and then drops at a slower rate. Consequently, the use of the auxiliary spring 20 results in a smaller initial heat release, as indicated by the shaded area 36 in FIG. 6, but releases more heat later in the cycle, as indicated by the shaded area 37 in FIG. 6.

One of the significant advantages of the invention is the reduction of undesirable engine emissions. More specifically, the emission of unburned hydrocarbons, which is a primary emission problem at low engine speeds and/or loads, is reduced by advancing the beginning of injection; and the emission of nitrogen oxides, which is a principal emission problem at high speeds and/or loads because of the higher temperatures produced, is reduced by decreasing the amount of fuel injected in the ignition delay period, thereby reducing the initial heat release and lowering the peak temperature in the cylinder.

While the present invention has been described with specific reference to the use of an auxiliary coil spring arrangement to control the rate of advancement of the plunger 12 during a portion of its advancing stroke, it is to be understood that other types of rate control devices may be used in alternative embodiments of the invention. For example, the fuel cavity beneath the tip of the plunger may be provided with a restricted exit port to permit the bleeding off of a portion of the fuel in the cavity when the plunger begins to advance, with a ball valve in the port closing after a predetermined time interval; or a hydraulic dashpot may be connected in line with the injection train; or other types of springs such as a Belleville spring may be used in place of the coil spring 20. It is also to be understood that the spring, or other rate control device, may be connected in line with the injection train at some point other than between the rocker arm and the plunger, such as between the cam follower and the push rod, or between the push rod and the rocker arm. Furthermore, although the invention has been described in connection with a system which provides only two different rates of advancement of the injector plunger, more than two different rates may be provided if desired, or a continuously variable rate control device can be used to vary the rate of plunger advancement throughout the entire injection stroke.

As can be seen from the foregoing detailed description, the improved fuel injection system provided by this invention reduces undesirable engine emission, reducing the emission of unburned hydrocarbons at low engine speeds and/or loads, while reducing the emission of nitrogen oxides at high engine speeds and/or loads. Thus, the improved injection system alleviates the particular emission problem that is most prevalent at any given speed and/or load. Moreover, by reducing the rate of pressure rise and the maximum gas pressure in the engine cylinders, the injection system provided by this invention reduces engine noise and mechanical stresses on the engine. Furthermore, by reducing the maximum gas temperature in the engine cylinders, this injection system also reduces the temperature and thermal stressing of the cylinder walls in the engine, thereby reducing the thermal load on the cooling system.

I claim as my invention:

1. A fuel injection system for a diesel engine, said system comprising an injection train connected between the camshaft of the engine and the plunger of a fuel injector for operating said plunger in synchronism with the rotation of said camshaft, *said fuel injector having a single nozzle that is continuously open during metering of the fuel with a fixed open area and* said injection train having a predetermined spring rate, auxiliary spring means connected in series with said injection train and having a spring rate substantially different from that of said injection train for advancing said plunger at a first rate determined by the spring rate of said auxiliary spring means in response to a predetermined reaction force on the tip of said plunger, and means *acting in parallel with said auxiliary spring means* for [rendering] *bypassing* said auxiliary spring means [ineffective] in response to a predetermined deflection thereof so that said plunger is thereafter advanced at a second rate determined by the spring rate of said injection train.

2. A fuel injection system as set forth in claim 1 which includes a return spring biasing said plunger toward its retracted position.

3. A fuel injection system as set forth in claim 1 wherein said auxiliary spring means is mounted for deflection in response to said predetermined reaction force on the tip of said plunger whereby the force applied by said spring to said plunger to advance the same increases with increasing reaction forces.

4. A fuel injection system as set forth in claim 1 wherein said auxiliary spring means is preloaded to exert an initial biasing force on said plunger.

5. A fuel injection system as set forth in claim 1 wherein said injection train comprises a cam follower riding on a cam on said camshaft, a push rod operatively connected to said cam follower, and a rocker arm operatively connected at one end to said push rod, and wherein said auxiliary spring means is operatively connected between the other end of said rocker arm and said plunger.

6. A fuel injection system as set forth in claim 5 wherein said auxiliary spring means is a coil spring.

7. A fuel injection system as set forth in claim 1 wherein said means for [rendering] *bypassing* said auxiliary spring means [ineffective] comprises means for effecting a direct connection between said injection train and said plunger in response to a predetermined deflection of said auxiliary spring means.

8. A fuel injection system as set forth in claim 6 wherein said means for [rendering] *bypassing* said auxiliary spring means [ineffective] comprises means for effecting a direct connection between said rocker arm and said plunger in response to a predetermined compression of said coil spring.

9. A fuel injection system as set forth in claim 1 wherein said auxiliary spring means is positioned to advance the ignition timing relative to the same injection train without said auxiliary spring means.

10. A fuel injection system as set forth in claim 1 wherein said auxiliary spring means is preloaded to apply to said plunger an advancing spring force greater than the maximum opposing forces applied to said plunger at low engine speeds or loads, but substantially less than the maximum opposing forces applied to said plunger at high engine speeds or loads.

11. In a fuel injection system for a diesel engine having an injection train connected between the camshaft of the engine and the plunger of the fuel injector for operating said plunger in synchronism with the rotation of said camshaft, *said fuel injector having a single nozzle that is continuously open during metering of the fuel with a fixed open area and* said injection train having a predetermined rate, the improvement comprising auxiliary spring means connected in series with said injection train and having a spring rate substantially lower than said predetermined spring rate of the balance of said injection train, and means *acting in parallel with said auxiliary spring means* for bypassing said auxiliary spring means in said injection train in response to a predetermined deflection of said auxiliary spring means.

* * * * *